(12) United States Patent
Hung et al.

(10) Patent No.: US 6,411,295 B1
(45) Date of Patent: Jun. 25, 2002

(54) APPARATUS AND METHOD FOR Z-BUFFER COMPRESSION

(75) Inventors: Daniel D. Hung; Samuel C. Wang, both of Santa Clara, CA (US); Hian Tiat Kwa, Ithaca, NY (US)

(73) Assignee: S3 Graphics Co., Ltd. (KY)

( * ) Notice: Subject to any disclaimer, the term of this patent is extended or adjusted under 35 U.S.C. 154(b) by 0 days.

(21) Appl. No.: 09/453,598

(22) Filed: Nov. 29, 1999

(51) Int. Cl.[7] .............................................. G06T 15/40
(52) U.S. Cl. ..................................................... 345/422
(58) Field of Search ................................. 345/422, 555

(56) References Cited

U.S. PATENT DOCUMENTS

| | | | | |
|---|---|---|---|---|
| 5,729,669 A | * | 3/1998 | Appleton ..................... | 345/422 |
| 5,771,046 A | * | 6/1998 | Izawa et al. ................. | 345/427 |
| 5,819,017 A | * | 10/1998 | Akeley et al. ............... | 345/421 |

* cited by examiner

*Primary Examiner*—Cliff N. Vo
*Assistant Examiner*—Alexander Reindor
(74) *Attorney, Agent, or Firm*—Carr & Ferrell LLP

(57) ABSTRACT

An apparatus and method are provided for Z-buffer compression and decompression. The memory requirements for Z-buffer are reduced with a slight loss of image quality. When coupled with over-sampling, the Z-buffer compression algorithm of the present invention decreases the memory requirements for over-sampled images with negligible loss of image quality. In one embodiment, once a block of h Z-values has been accumulated in the memory, it is compressed by an encoder. Next, the minimum (MIN) and maximum (MAX) values are recorded. Thereafter, the range between MIN and MAX is divided into a number of intervals (L). Instead of storing each of the 32-bit samples, an index $k_i$ is used to represent each sample. The index $k_i$ is calculated for i equals 1 to h, using the following equation:

$$k_i = (Z_i - MIN) * L / (MAX - MIN).$$

This formula will yield a number between 0 and the number of intervals. Next the compressed Z-values are transferred to a Z-buffer. This saves memory space because only 2 full values (MAX and MIN) have to be stored, and the remaining h indices can be stored using smaller numbers of bits because there are only a finite, small number of intervals. To decompress a value, the MAX and MIN from the block which contains that value is first obtained. The actual Z-value may then be decoded by a decoder using the equation: $Z_i = k_i * (MAX - MIN) / L$.

24 Claims, 2 Drawing Sheets

APPARATUS AND METHOD FOR Z-BUFFER COMPRESSION

TECHNICAL FIELD

The present invention relates generally to storing and retrieving the depth information of a three-dimensional object in computer graphics systems, and particularly to an apparatus and method of Z-buffer compression.

BACKGROUND ART

Computer graphics systems are frequently used to model a scene having three-dimensional objects and then to display them on a two-dimensional display device such as a cathode ray tube. One such system in common use is a polygon-based, object-order graphics system in which three-dimensional objects in a scene are each represented by a multitude of polygons (or primitives) that approximate the shapes thereof. Depending upon the orientation selected for viewing the scene in two dimensions, many of the primitives representing objects in the scene will be hidden behind other primitives and thus not displayed. Primitives not completely hidden are termed visible and will be displayed, either in full or in part depending upon whether a portion of a given primitive is hidden, in the rendered image on the display device. As the depth complexity (i.e. the number of levels of primitives hidden behind one another) of a scene to be rendered increases, the percentage of all primitives representing the scene that will ultimately be visible by an observer on the display device decreases significantly. Thus, in many cases, most of the primitives for a scene will be hidden.

Conventional computer graphics systems typically have a frame buffer and a Z-buffer. The frame buffer is a memory (e.g. DRAM or SRAM) which holds the digital representation of the color and intensity for each pixel in the image. The frame buffer is also referred to as a video bitmap. The Z-buffer (also referred to as a depth buffer) is a large array of memory with an entry for each pixel in the frame buffer.

One method for determining which primitives will be visible or hidden involves the use of a Z-buffer. The Z axis in a graphics system reflects the distance from a specific observer's viewpoint. Thus, a larger Z value represents a greater distance from the viewpoint. A comparison of Z values of points on the generated objects determines which object is closest to the viewpoint and therefore should appear on the two-dimensional display. As a part of processing the graphical data for a scene, pixels are generated for each of the primitives in the scene. In Z-buffer systems, as each pixel is generated, its Z coordinate (new Z-value or Znew) is compared with the Z coordinate previously stored in the Z-buffer (old Z-value or Zold). Before processing the first primitive for a scene, the Z-buffer is initialized by storing the value corresponding to a maximum distance (Zmax) in the Z-buffer entry for every pixel so that initially Zold corresponds to Zmax. In general, if Znew is less than Zold (indicating that this pixel is closer to the viewpoint than the previous viewpoint), then the pixel is written to the display device and the Z-buffer memory is updated to contain Znew. If Znew is greater than or equal to Zold, then the pixel is not written and the Z-buffer remains unchanged. All of the pixels for a primitive that is completely hidden will ultimately be overwritten in the Z-buffer during this process so that the primitive is not displayed. U.S. Pat. No. 4,951,232 entitled "Method of Updating Pipelined, Single Port Z-Buffer by Segments on a Scan Line," provides good background material on Z-buffering.

In computer graphics, "rendering" is the process of translating a set of data into a picture that can be displayed. In the rendering process, a picture database typically holding polygon data is read, and calculations are performed by the rendering hardware, pixel by pixel, to decide the color of each pixel.

When a polygon is rendered, a color sample is obtained for each pixel that the polygon covers. If over-sampling is carried out, each pixel will have multiple corresponding color samples that are averaged to give the final color of the pixel. Each color sample has an associated Z-value and a location. The Z-buffer stores the smallest Z-value so far encountered for each location. If a color sample has a Z-value smaller than the value for that location as recorded in the Z-buffer, that sample is written into the frame buffer and the Z-buffer is updated. Otherwise, the color sample is discarded.

However, one of the disadvantages of Z-buffering is that it is expensive in terms of the amount of memory required. The size of the Z-buffer is in direct proportion to the size of the required output, i.e., a larger Z-buffer is required for a larger picture or an over-sampled picture. For example, each Z-value is typically a 4-byte value, which means that for a low-resolution 640×480 image, 1228800 bytes ($\approx$1 MB) of memory is needed for the Z-buffer. In addition, if 16× over-sampling is employed, the size of the Z-buffer increases to approximately 16 MB which is prohibitively large. Thus, the size of the Z-buffer disadvantageously increases the cost and size of the computer graphics systems.

With the importance of providing cheaper and smaller computer graphics systems, particularly for portable computers, improvements in Z-buffer design have been long sought but have eluded those skilled in the art.

DISCLOSURE OF THE INVENTION

The present invention provides a system and method for Z-buffer compression and decompression. The memory requirements for Z-buffer are reduced with a slight loss of image quality. When coupled with over-sampling, the Z-buffer compression algorithm of the present invention significantly reduces the memory requirements for over-sampled images with negligible loss of image quality.

The present invention further provides a system and method for Z-buffer compression and decompression where, once a block of h Z-values has been accumulated in the memory, the block is compressed by an encoder. First, the minimum (MIN) and maximum (MAX) values are recorded. Next, the range between MIN and MAX is divided into a number of intervals (L). Instead of storing each of the 32-bit samples, an index $k_i$ is used to represent each sample. The index $k_i$ is calculated for i equals 1 to h, using the following equation: $k_i=(Z_i-\text{MIN})*L/(\text{MAX}-\text{MIN})$. This equation will yield a number between 0 and the number of intervals. Next the compressed Z-values are transferred to a Z-buffer. This saves memory space for the Z-buffer because only 2 full values (MAX and MIN) have to be stored, and the remaining h indices can be stored using smaller numbers of bits because there are only a finite, small number of intervals. To decompress a value, the MAX and MIN from the block which contains that value are first obtained. The actual Z-value may then be decoded by a decoder using the equation: $Z_i=k_i*(\text{MAX}-\text{MIN})/L$. This significantly reduces memory requirements.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
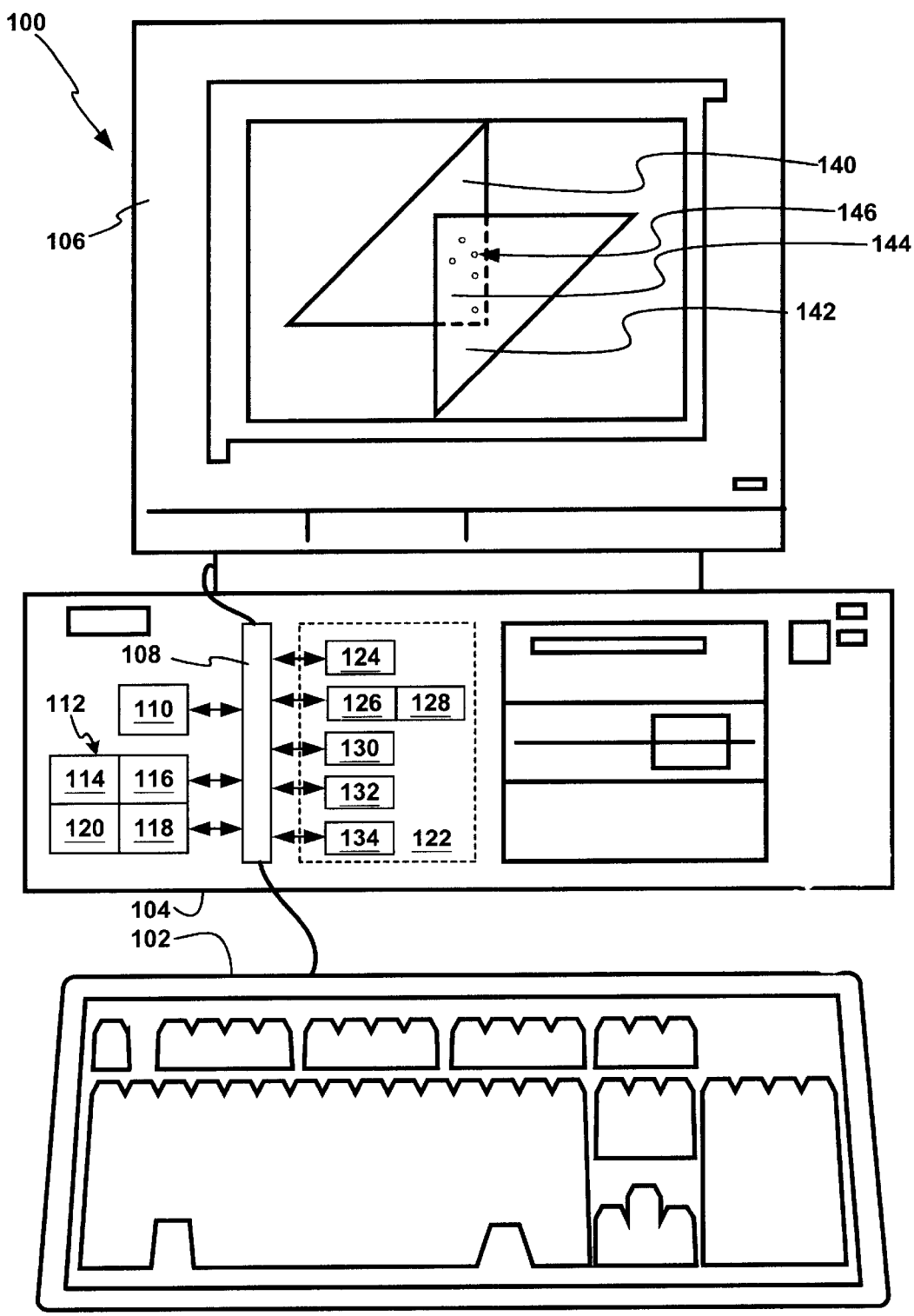
FIG. 1 is a system incorporating the present invention.

Referring now to FIG. 1, therein is shown a computer system 100 consisting of an input keyboard 102, a computer 104, and an output display 106.

The computer 104 includes any computer controlled graphics system for generating complex or three-dimensional images. The computer 104 includes a bus 108 for transmitting digital information between the various parts of the computer 104. One or more microprocessors, or processors 110 are coupled to the bus 108 for processing information.

The information, along with the instructions for how the information is to be processed, is stored in a hierarchical memory system 112 that includes a mass storage device 114, a read only memory (ROM) 116, a main memory 118, and a cache memory 120. The mass storage device 114 is used to store vast amounts of digital data. The mass storage device 114 may include one or more hard disk drives, floppy disk drives, optical disk drives, tape drives, CD ROM drives, or any number of other types of storage devices having media for storing data digitally. The ROM 116 is used to store digital data of a permanent basis, such as instructions for the processors 110. The main memory 118 is used for storing digital data on an intermediate basis. The main memory 118 can be dynamic random access memory (DRAM). The cache memory 120 is used to store frequently used data values for quick access by the processors 110. The cache memory 120 can be static random access memory (SRAM).

The computer 104 also includes a graphics system 122. The graphic system 122 includes a graphic subsystem 124, an encoder 126, a decoder 128, a comparator 130, a frame buffer 132, and a Z-buffer 134. The comparator 130 is coupled to the memory system 112 for comparing each Z-value with the respective new Z-value for each pixel to determine whether each of the Z-values is smaller than the respective new Z-value. The memory system 112 will then store the new Z-values if the new Z-values are smaller than the Z-values.

The frame buffer is a memory that holds the digital representation of color and intensity for each pixel in the image. The Z-buffer 134 is a memory that holds one number for each pixel in the frame buffer. The value of this number indicates the distance between the observer and the object being displayed at the pixel.

The processor 110 provides the graphics system 122 with graphics data, such as drawing commands, coordinate vertex data, and other data related to an object's geometric position, color, texture, shading, and other surface parameters. The graphics subsystem 124 processes the object data in the following four steps: (1) graphical data from the processor 110 is converted into a screen coordinate system, including the depth (Z-value) of a displayed object; (2) pixel data is generated based on the resulting primitives (e.g., points, lines, polygons, and meshes) provided by step (1); (3) Z-buffering, blending, texturing, and anti-aliasing functions are performed based on the pixel data and the resulting pixel values and Z values are stored in the frame buffer 132 and the Z buffer 134, respectively; and (4) reading the pixel values and Z-values from the frame buffer 132 and the Z-buffer 134 respectively and displays an image on the output display 106.

On the output display 106 is shown two triangles 140 and 142 with an overlap portion 144. The triangle 142 is "in front" of the triangle 140 so that the overlap portion 144 should have the color of the triangle 142 in the final picture. A number of small holes 146 is shown on the overlap portion 144 to illustrate a phenomenon commonly known as "pixel bleed through" where incorrect Z-values at these locations cause pixels there to take on the color of the triangle 140 behind, making the triangle 142 appear as if it has a number of small holes in it.

Figure 2:
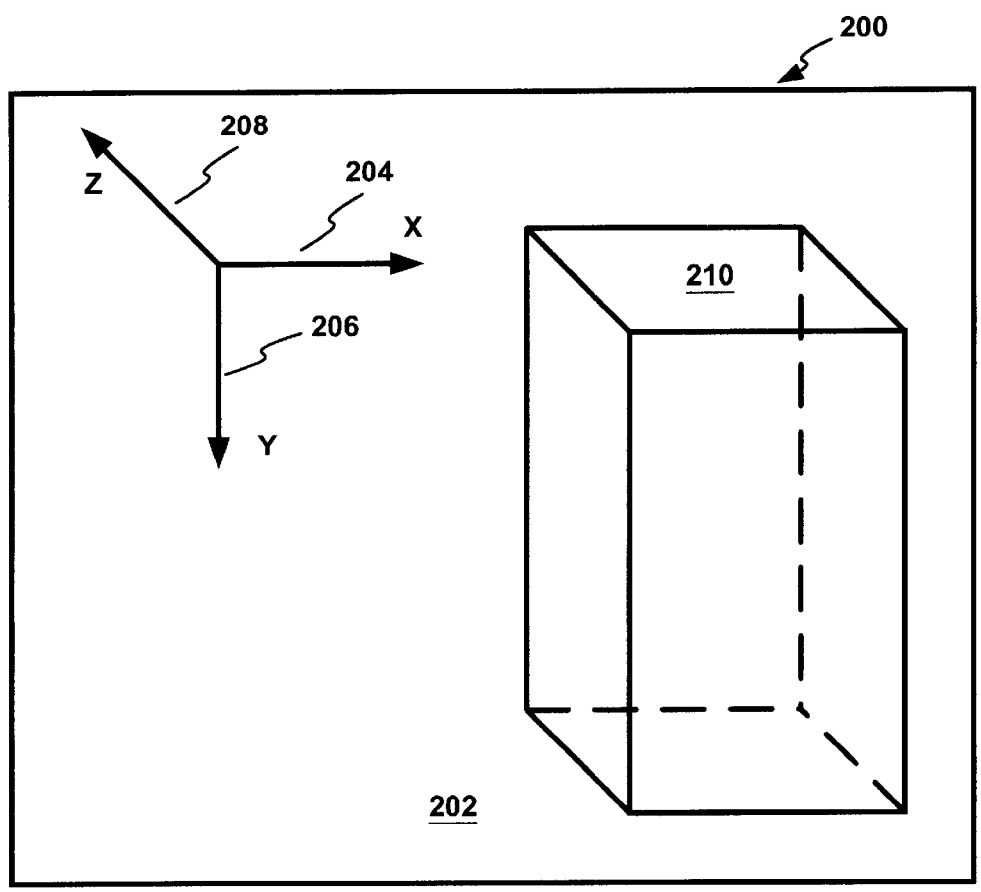
FIG. 2 is an illustration of an orthogonal coordinate system and an object on a display.

Referring now to FIG. 2, therein is shown a screen 202 of an output display 200. An orthogonal coordinate system having X, Y, and Z axes is shown overlaid onto the screen 202. X axis 204, Y axis 206 and Z axis 208 will not normally appear on the screen 202 during normal operation of the output display 200. An object 210 is shown on the screen 202. The coordinates represented by the X axis 204 and Y axis 206 refer to pixel coordinates, while the coordinates represented by the Z axis 208 refers to the distance between an observer and the object 210 being displayed at the pixel. A smaller Z value indicates that the object 210 is closer to the observer.

Figure 3:
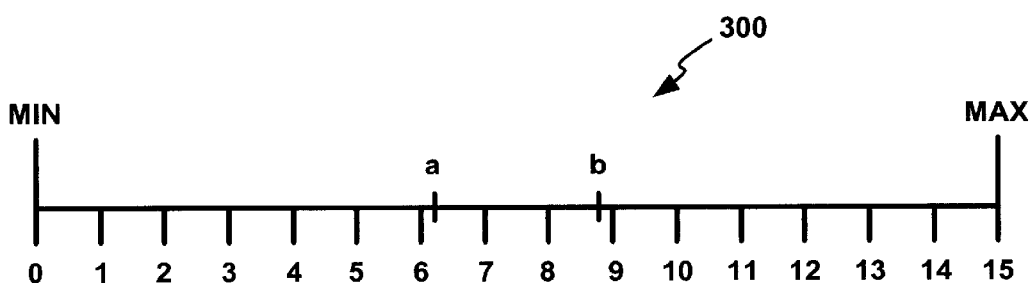
FIG. 3 is a number line which is used to illustrate a basic Z-buffer compression and decompression algorithm constructed in accordance with the present invention.

Referring now to FIG. 3, therein is shown a basic Z-encoding (compression) and decoding (decompression) algorithm constructed in accordance with the present invention. The number line 300 includes a minimum (MIN), a maximum (MAX), a point "a" and a point "b". The basic algorithm is designed to work with the computer system 100 as shown in FIG. 1.

The Z-buffer 134 (FIG. 1) is divided into blocks of 16 samples. Each block is compressed by storing only the minimum (MIN) and maximum (MAX) Z-values for that block, along with 16 indices (0 to 15, FIG. 3). The range delimited by these two values is divided into a number of intervals, and the 16 Z-values are encoded as indices indicating which interval contains that Z-value. Point "a" would be compressed with an index value of 6, and point "b" would be compressed with an index value of 9. This saves space because only 2 full values have to be stored, and the remaining 16 indices can be stored using smaller numbers of bits because there are only a finite, small number of intervals.

For example, in the case where two 32-bit values for the MIN and MAX are used and the range is divided into 15 intervals, since numbers between 0 and 15 inclusive can be represented using 4 bits, each index then only needs to be 4 bits wide.

To decompress a Z-value, the MAX and MIN from the block which contains that Z-value is first obtained. The Z-value can be obtained by multiplying its index by the difference between the MAX and MIN and then dividing the result by the number of intervals.

Figure 4:
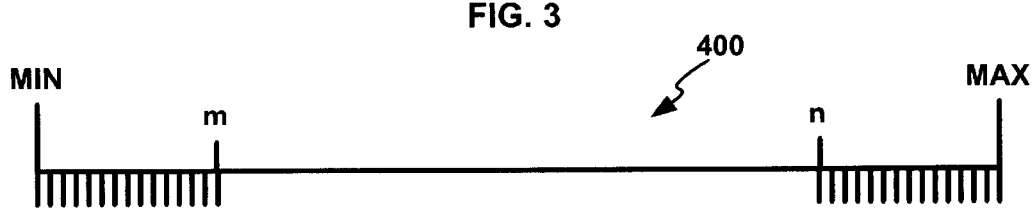
FIG. 4 is a number line which is used to illustrate a clustered Z-buffer compression and decompression algorithm constructed in accordance with the present invention.

Referring now to FIG. 4, therein is shown a clustered (modified) Z encoding (compression) and decoding (decompression) algorithm constructed in accordance with the present invention. The number line 400 includes a minimum (MIN), a maximum (MAX), a point "m" and a point "n". The modified algorithm is designed to work with the computer system 100 as shown in FIG. 1.

At the edges of any object being drawn, there will be a sudden change in Z-value. It is found that in blocks spanning the edges of objects, the Z-values are clustered around two points: the Z-value of the object in front, and the Z-value of the object behind. In such cases, the clustered Z encoding and decoding algorithm is used to optimize the accuracy of the compression and prevent pixel bleed through. Therefore, if during the compression it is detected that Z-values in the middle of the range are not being used at all, the block is compressed using the modified algorithm (described below) that optimizes for the edge case.

Instead of specifying that the intervals are positioned uniformly over the entire range, the clustered algorithm arranges the intervals so that all the index positions are clustered around MIN and MAX. A number m close to the MIN and a number n close to the MAX are determined using mathematical equations. The numbers m and n are then used to generate the indices depending on whether the Z-value is closer to the MIN or the MAX. In this embodiment there are 16 indices (15 intervals) between MIN and m and 16 indices (15 intervals) between n and MAX.

To decompress a Z-value encoded using the clustered algorithm, the MAX and MIN from the block which contains that Z-value are first obtained. The Z-value can then be decoded by using two different equations depending on whether the index is greater than or less than 15.

In operation, as shown in FIG. 1 and FIG. 3 of the present invention, once a block of h Z-values has been accumulated in the memory 118, it is compressed by the encoder 126. Next, the minimum (MIN) and maximum (MAX) values are recorded. Thereafter, the range between MIN and MAX is divided into a number of intervals (L). Instead of storing each of the 32-bit samples, an index $k_i$ is stored which represents each of the samples. The index $k_i$ is calculated for i equals 1 to h, using the following equation:

$$k_i = (Z_i - \text{MIN}) * L / (\text{MAX} - \text{MIN}) \quad \text{(Equation 1)}$$

This formula will yield a number between 0 and the number of intervals. Next the compressed Z-values are transferred to the Z-buffer 134. This saves memory space because only 2 full values (MAX and MIN) have to be stored, and the remaining h indices can be stored using smaller numbers of bits because there are only a finite, small number of intervals.

To decompress a value, the MAX and MIN from the block which contains that value is first obtained. The actual Z-value may then be decoded by the decoder 128 using the equation:

$$Z_i = k_i * (\text{MAX} - \text{MIN}) / L \quad \text{(Equation 2)}$$

In a preferred embodiment, h equals 4×4 (16) and L equals 31. In the preferred embodiment, it is found that when L equals 31, an optimal number of intervals is provided that gives the best trade-off between compression and accuracy. In this case, 16 Z-values can be stored in 128 bits. The memory allocation for each block is as follows:

| 24 bits | MIN |
|---|---|
| 24 bits | MAX |
| 16 * 5 bits | 16 index values |
| Total: 128 bits | |

The MIN and MAX can vary between 32 and 16 bits, and workable systems have 32 bit float, 32 bit fixed, 24 bit fixed, and even 16 bit fixed.

In order to reduce the number of times a given Z-block is compressed and decompressed, a block-based traversal algorithm may be used; i.e., instead of performing color and Z calculations point by point, the calculations are grouped into 4×4 blocks of points. Next, the 4×4 block to be processed next is located. Thereafter, the corresponding 16 Z-values are decompressed into the cache memory 120. The color samples and Z-values of the 4×4 block of points are then calculated and the cache memory 120 and frame buffer 132 updated, if necessary. Finally, the 16 Z-values are compressed and then transferred from the cache memory 120 back into the Z-buffer 134.

In operation, as shown in FIG. 1 and FIG. 4 of the present invention, if it is detected during compression that Z-values in the middle of the range are not being used at all, the block is compressed using the clustered algorithm that optimizes for the edge case. This improves the accuracy of the compression and prevents pixel bleed through.

An h block of Z-values is compressed using the encoder 126. Next, the minimum (MIN) and maximum (MAX) values are recorded. An index $p_i$, calculated for i equals 1 to h, uses Equations 3–4 if $Z_i$ is closer to MIN than to MAX and Equations 5–6 if $Z_i$ is closer to MAX than to MIN as follows:

$$p_i = (Z_i - \text{MIN}) * L_1 / (m - \text{MIN})$$

$$m = \text{MIN} + (f * (\text{MAX} - \text{MIN}))$$

$$p_i = h + (Z_i - n) * L_1 / (\text{MAX} - n)$$

$$n = \text{MIN} + ((1-f) * (\text{MAX} - \text{MIN})) \quad \text{(Equations 3–6)}$$

$L_1$ is a number of intervals between m and MIN, and MAX and n; and f is a positive number less than 1. In a preferred embodiment, h equals 4×4 (16), $L_1$ equals 15, and f equals approximately 0.056. Next the compressed Z-values are transferred to the Z-buffer 134.

To accommodate both the basic and the clustered algorithm when the clustered algorithm is used, MAX is stored in a memory location "Value A" (or "A") and MIN is stored in another memory location "Value B" or ("B"). When the basic algorithm is used, MIN is stored in Value A and MAX is stored in Value B. This allows the decompression routine to distinguish between the two compression schemes.

The decompression algorithm uses an (A>B) comparison to decide whether the block was encoded using a clustered algorithm or a basic algorithm. Decompression can be done using decoder 128 with the following routine:

if (A>B)
  if ($p_i$>$L_1$)
    $Z_i$=n+(($p_i$−16)*(MAX−n)/L1)
  else
    $Z_i$=$p_i$*(m−MIN)/$L_1$+MIN
else
  $Z_i$=$k_i$*(MAX−MIN)/L In a preferred embodiment, h equals 4×4 (16) and L equals 31.

The Z-buffer compression algorithm as outlined above is a lossy algorithm. However, the error rate is very small, at approximately 0.03% or lower. The impact of this error may be further reduced by coupling the Z-buffer compression algorithm with over-sampling.

As mentioned before, over-sampling increases the amount of memory space needed for Z-buffering. Z-buffer compression constructed using the present invention reduces the amount of memory used by the Z-buffer 134. Therefore, the use of the present invention makes over-sampling less expensive in terms of memory cost.

Because samples are compressed in 4×4 blocks as used in one of the embodiments, bleed-through artifacts caused by Z-buffer compression errors can be a maximum of four samples wide. In an image that is rendered using 4× over-sampling, four samples translate to an actual pixel width of 2 pixels. Therefore, artifacts can be a maximum of two pixels wide. When the over-sampling factor is increased to 64×, the samples are taken much closer together, and now four samples correspond to an actual pixel width of 0.5 pixels. When the 64× filter is applied, the visual impact of this error becomes virtually undetectable. Further, as the over-sampling factor increases, the size of the range (MAX−MIN) becomes smaller, hence increasing the accuracy of the algorithm constructed in accordance with the present invention.

Therefore, by using the Z-buffer compression algorithm in accordance with the present invention, the amount of memory used by a Z-buffer can be reduced with only slight lossiness. However, when coupled with over-sampling, the Z-buffer compression algorithm of the present invention decreases the memory requirements for over-sampled images with negligible loss of image quality.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. An apparatus for processing Z-values representing relative depth of pixels of a computer graphical object on a display for a computer graphics system, comprising:
    a memory for storing original Z-values;
    encoding means coupled to said memory for encoding a block of h Z-values into encoded Z-values by determining a minimum Z-value MIN, a maximum Z-value MAX, and h index values $k_i$, wherein each of said index values ki is determined by a first equation:
    $k_i=(Z_i-MIN)*L/(MAX-MIN)$, where $Z_i$ is one of the h Z-values, L is a number of intervals between MIN and MAX, and i equals 1 to h; and
    a Z-buffer coupled to said encoding means for storing said encoded Z-values.

2. The apparatus as claimed in claim 1 further including:
    decoding means coupled to said Z-buffer and said memory for decoding said encoded Z-values by determining each of the Z-values using a second equation:
    $Z_i=k_i*(MAX-MIN)/L$; and wherein:
    said memory stores said decoded Z-values.

3. The apparatus as claimed in claim 2 further including:
    a comparator coupled to said memory for comparing each of said Z-values with each respective new Z-value for each pixel to determine whether each of said respective new Z-values is smaller than each of said Z-values; wherein said memory stores said respective new Z-values if said respective new Z-values are smaller than said Z-values;
    a frame buffer coupled to said Z-buffer for storing pixel values; and wherein:
        said encoding means encodes said Z-values into encoded Z-values and transfers said encoded Z-values from said memory into said Z-buffer.

4. The apparatus as claimed in claim 1 wherein h equals 4×4.

5. The apparatus as claimed in claim 1 wherein L equals 31.

6. An apparatus for processing Z-values representing relative depth of pixels of a computer graphical object on a display for a computer graphics system, comprising:
    a memory for storing original Z-values;
    encoding means coupled to said memory for encoding said block of h Z-values into encoded Z-values by determining a minimum Z-value MIN, a maximum Z-value MAX, and index values $p_i$, and wherein:
    each of said index values $p_i$ is determined by a first equation if $Z_i$ is closer to MIN than to MAX:
    $p_i=(Z_i-MIN)*L/(m-MIN)$; and
    each of said index values pi is determined by a second equation if $Z_i$ is closer to MAX than to MIN:
    $p_i=h+(Z_i-n)*L/(MAX-n)$,
    where $Z_i$ is one of the h Z-values, L is a number of intervals between MIN and
    MAX, i equals 1 to h,
    $m=MIN+(f*(MAX-MIN)$, $n=MIN+((1-f)*(MAX-MIN)$, and f is a positive number less than 1; and
    a Z-buffer coupled to said encoding means for storing said encoded Z-values.

7. The apparatus as claimed in claim 6 further including:
    decoding means coupled to said Z-buffer and said memory for decoding said encoded Z-values by determining each of the Z-values using a third equation if $p_i>L$:
    $Z_i=n+((p_i-h)*(MAX-n)/L)$, and determining each of the Z-values using a fourth equation if $p_i<L$:
    $Z_i=MIN+(p_i*(m-MIN)/L)$; and wherein:
        said memory stores said decoded Z-values.

8. The apparatus as claimed in claim 7 further including:
    a comparator coupled to said memory for comparing each of said Z-values with each respective new Z-value for each pixel to determine whether each of said respective new Z-values is smaller than each of said Z-values; wherein said memory stores said respective new Z-values if said respective new Z-values are smaller than said Z-values;
    a frame buffer coupled to said Z-buffer for storing pixel values; and wherein:
    said encoding means encode said Z-values into encoded Z-values and transfers said encoded Z-values from said memory into said Z-buffer.

9. The apparatus as claimed in claim 6 wherein h equals 4×4.

10. The apparatus as claimed in claim 6 wherein L equals 15.

11. The apparatus as claimed in claim 6 wherein f equals approximately 0.056.

12. A method for processing Z-values representing relative depth of pixels of a computer graphical object on a display for a computer graphics system, the computer graphics system including a frame buffer for storing pixel values, a Z-buffer for storing Z-values, and a memory, the method comprising the steps of:
    storing original Z-values in the memory;
    encoding a block of h Z-values from the memory into encoded Z-values by determining a minimum Z-value MIN, a maximum Z-value MAX, and h index values $k_i$, wherein each of said index values $k_i$ is determined by a first equation:

$k_i=(Z_i-\text{MIN})*L/(\text{MAX}-\text{MIN})$, where $Z_i$ is one of the h Z-values, L is a number of intervals between MIN and MAX, and i equals 1 to h; and storing said encoded Z-values in the memory.

13. The method as claimed in claim 12 further including the steps of:

decoding said encoded Z-values from the memory by determining each of the Z-values using a second equation:

$Z_i=k_i*(\text{MAX}-\text{MIN})/L$; and storing the decoded Z-values in the memory.

14. The method as claimed in claim 13 further including the steps of:

comparing each of said Z-values with each respective new Z-value for each pixel to determine whether each of said respective new Z-values is smaller than each of said Z-values;

storing said respective new Z-values in the memory if said respective new Z-values are smaller than said Z-values;

calculating pixel values;

storing said pixel values in the frame buffer;

encoding said Z-values into encoded Z-values; and transferring said encoded Z-values from the memory into the Z-buffer.

15. The method as claimed in claim 14 wherein the steps of calculating pixel values includes averaging pixel values of a plurality of color samples.

16. The method as claimed in claim 12 wherein h equals 4×4.

17. The method as claimed in claim 12 wherein L equals 31.

18. A method for processing Z-values representing relative depth of pixels of computer graphical object on a display for a computer graphics system, the computer graphics system including a frame buffer for storing pixel values, a Z-buffer for storing Z-values, and a memory, the method comprising the steps of:

storing original Z-values in the memory;

encoding said block of h Z-values into encoded Z-values by determining a minimum Z-value MIN, a maximum Z-value MAX, and index values $p_i$, wherein:

each of said index values $p_i$ is determined by a first equation if $Z_i$ is closer to MIN than to MAX:

$p_i=(Z_i-\text{MIN})*L/(m-\text{MIN})$, and each of said index values $p_i$ is determined by a second equation if $Z_i$ is closer to MAX than to MIN:

$p_i=h+(Z_i-n)*L/(\text{MAX}-n)$, where $Z_i$ is one of the h Z-values, L is a number of intervals between MIN and MAX, i equals 1 to h, $m=\text{MIN}+(f*(\text{MAX}-\text{MIN}))$, $n=\text{MIN}+((1-f)*(\text{MAX}-\text{MIN}))$, and f is a positive number less than 1; and storing said encoded Z-values in the memory.

19. The method as claimed in claim 18 further including the steps of:

decoding said encoded Z-values by determining each of the Z-values using a third equation if $p_i>L$:

$Z_i=n+((p_i-h)*(\text{MAX}-n)/L)$; and determining each of the Z-values using a fourth equation if $p_i<L$:

$Z_i=\text{MIN}+(p_i*(m-\text{MIN})/L)$; and storing the Z-values in the memory.

20. The method as claimed in claim 19 further including the steps of:

comparing each of said Z-values with each respective new Z-value for each pixel to determine whether each of said respective new Z-values is smaller than each of said Z-values;

storing said respective new Z-values in the memory if said respective new Z-values are smaller than said Z-values;

calculating pixel values;

storing said pixel values in the frame buffer;

encoding said Z-values into encoded Z-values; and transferring said encoded Z-values from the memory into the Z-buffer.

21. The method as claimed in claim 20 wherein the steps of calculating pixel values includes averaging pixel values of a plurality of color samples.

22. The method as claimed in claim 18 wherein h equals 4×4.

23. The method as claimed in claim 18 wherein L equals 15.

24. The method as claimed in claim 18 wherein f equals approximately 0.056.

* * * * *